Jan. 11, 1966     B. J. JOHNSON     3,228,694
LIVESTOCK AUCTION GAME APPARATUS
Filed Jan. 15, 1963

INVENTOR
BRUCE J. JOHNSON

BY Semmes & Semmes
ATTORNEYS

United States Patent Office 3,228,694
Patented Jan. 11, 1966

3,228,694
LIVESTOCK AUCTION GAME APPARATUS
Bruce J. Johnson, 9942 Cedar St., Shawnee Mission, Kans.
Filed Jan. 15, 1963, Ser. No. 251,642
1 Claim. (Cl. 273—134)

The present invention relates generally to a livestock auction game and more specifically combines the conventional features of a playing board with novel features of livestock purchase cards having indicia representative of the actual market value of cattle, hogs and sheep.

Accordingly, it is an object of the present invention to provide a game of amusement simulating a livestock auction.

Another object of the present invention is to provide a livestock auction game combining the conventional features of a playing board with novel features of livestock purchase cards bearing indicia indicative of both the character and "actual" market value of livestock property and spinning mechanism structure with associated indicia representative of comparative values of money for determining the minimum permissible bid.

Other objects will become apparent from the ensuing specification and attached drawings, wherein.

Figure 1:
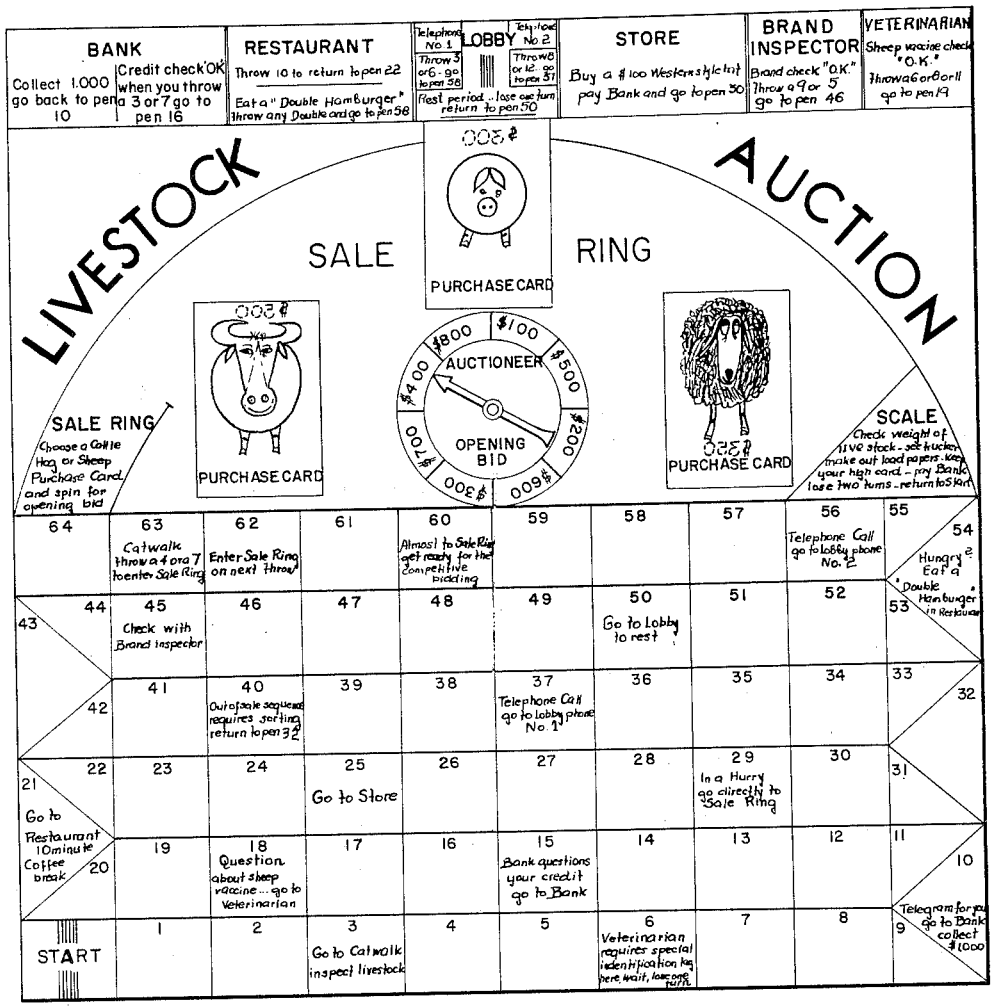
FIG. 1 illustrates the playing board with legend spaces, spinning mechanism with associated indicia representative of values of money used in determining the minimum permissible bid, and purchase cards bearing indicia indicative of the character and market value of livestock property.

As seen in FIG. 1, the playing board consists of a top and bottom portion, the latter being divided into 64 legend spaces constituting a playing path. As will be seen, some of the marked areas or legend spaces have instructions associated therewith applicable to players registering movement thereto. The top portion of the playing board contains a plurality of stations including indicia indicative of penalties or rewards to be assessed upon movement thereto. Located immediately above the 64 legend spaces is a circular spinning area containing indicia setting forth comparative values of money pertaining to bidding. Within the center of the spinning area is located a conventional spinner for determining, by chance, a particular value of money.

Surrounding the circular spinning area are located a plurality of spaces defining purchase card areas. Within these areas are located purchase cards identifying cattle, hogs and sheep. While the character of livestock is shown on one side of each purchase card, indicia representative of the "actual" market value of the cattle, hogs and sheep are present on the other side. Note, for example, the $500 "actual" value attached to the cow of FIG. 1. To the left of the cattle purchase area are located indicia representative of a sale ring which includes instructions for players registering movement thereto. Adjacent the sheep purchase card area are indicia representative of a scale, including weigh-in instructions, and indicia indicating penalties to be assessed.

Figure 2:
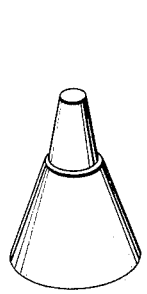
FIG. 2 illustrates a sample playing piece for movement along the legend spaces of the playing board for identifying the position of each player thereon.

As seen in FIG. 2, marker means are employed, corresponding to the respective players, for positioning on the playing board legend spaces to identify the locations of players.

Figure 3:
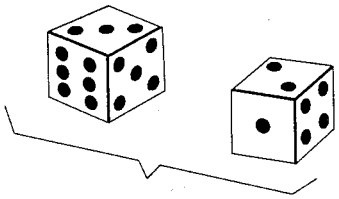
FIG. 3 illustrates a pair of dice used to determine the number of legend spaces to move each playing piece along the playing board.

The dice means of FIG. 3 are used to determine the extent of a player's movement along the playing board legend spaces.

Tha game is initiated by each player choosing a particular playing piece and being given a selected amount of scrip money. Then, the purchase cards are shuffled within each category and placed on the playing board in the designated spaces. Lots are drawn as to the beginning order of play. In rotating order, each player then rolls the dice to determine the number of legend spaces to move his playing piece, all players being governed by legend indicia.

When a player enters the sale ring, the action by the players in proceeding through the legend spaces of the playing path stops and a purchase card is drawn by the "entering" player. The auctioneer's opening bid is obtained by turning the spinner. Competitive bidding then begins with the player who holds the purchase card starting with an amount higher than that indicated by the auctioneer's opening bid. That is, after the purchase card has been drawn by the player entering the sale ring and the auctioneer's opening bid has been obtained through the use of the spinner, the competitive bidding begins by the holder of the purchase card speaking aloud "I bid $———." Each player in sequence of playing order then states his bid or passes and the bidding continues until one of the bidding players is the successful high bidder. Importantly, the purchase card holder does not reveal the information shown on the purchase card relating to "actual" value of livestock being bid on. The successful high bidder is the buyer of the livestock and retains the purchase card which represents the "actual" value of the livestock purchase. The high bidder pays the bank the amount bid. He then goes to the scale space and follows the directions in this space before starting to play again. If the original holder of the purchase card is not the high bidder, he takes the place on the playing board which the high bidder previously occupied. The purchase cards are used for scoring purposes by each player at the end of the game.

Manifestly, many modifications of the present game may be envisioned without departing from the scope of invention, as defined by the subjoined claim.

I claim:

A board game apparatus for use by a plurality of players for simulating a livestock auction, comprising:

(a) a playing board consisting of a top and bottom portion, said bottom portion being divided into a plurality of marked areas constituting a playing path, some of said marked areas having printed instructions associated therewith applicable to players registering movement thereto for directing future movement of said players, said top portion of said playing board being divided into first and second parts, said first part having stations with indicia indicative of penalties to be assessed upon movement thereto, said second part containing indicia defining a circular spinning area with printed matter representative of comparative values of money pertaining to bidding;

(b) marker means including at least two individually distinctive elements corresponding to the respective players for positioning on said playing board in each of said marked areas to identify the locations of said players on said playing board;

(c) a spinning device for determining minimum bids, said device attached to said playing board and located within said circular spinning area, said spinning device including a pointer for determining by chance one of said comparative values of money represented by said printed matter of said circular spinning area;
(d) dice means to determine the extent of the players' movement along said playing path; and
(e) a plurality of groups of purchase cards, each of said groups containing individual cards having on one side thereof similar indicia representative of a particular type of livestock and having on the other side thereof different indicia indicative of the actual market value of the livestock represented by each of said individual cards.

References Cited by the Examiner

UNITED STATES PATENTS

| 1,391,333 | 9/1921 | McManus | 273—134 |
| 2,026,082 | 12/1935 | Darrow | 273—134 |
| 2,174,058 | 9/1939 | McGennis | 273—134 |
| 2,976,044 | 3/1961 | Corpening | 273—134 |

DELBERT B. LOWE, *Primary Examiner.*

EVERETT R. ZACK, *Assistant Examiner.*